United States Patent [19]

Hausenblas et al.

[11] 4,113,279
[45] Sep. 12, 1978

[54] HYDROPNEUMATIC SPRING ELEMENT

[75] Inventors: Helmut Hausenblas, Kassel-Ki.; Hans-Erich Holzforster, Fuldatal, both of Fed. Rep. of Germany

[73] Assignee: Thyssen Industrie Aktiengesellschaft, Essen, Fed. Rep. of Germany

[21] Appl. No.: 691,978

[22] Filed: Jun. 2, 1976

[30] Foreign Application Priority Data

Jun. 7, 1975 [DE] Fed. Rep. of Germany ....... 2525493

[51] Int. Cl.² .............................................. B60G 3/12
[52] U.S. Cl. ................. 280/705; 188/264 D; 267/65 R; 280/708
[58] Field of Search ............ 280/705, 708; 267/65 R; 188/264 D, 274

[56] References Cited

U.S. PATENT DOCUMENTS

| 2,973,195 | 2/1961 | Armstrong | 280/705 |
|---|---|---|---|
| 3,371,940 | 3/1968 | Sinclair | 280/705 |
| 3,374,005 | 3/1968 | Donlon | 280/705 |
| 3,395,931 | 8/1968 | Piret | 280/705 |
| 3,459,439 | 8/1969 | Sinclair | 280/705 |
| 3,504,932 | 4/1970 | Kozowyk | 280/705 |
| 3,602,470 | 8/1971 | Reynolds | 280/705 |
| 3,614,125 | 10/1971 | Sinclair | 280/705 |
| 3,736,002 | 5/1973 | Grosseau | 280/705 |
| 3,795,291 | 3/1974 | Naito | 188/274 |

Primary Examiner—Joseph F. Peters, Jr.
Assistant Examiner—John A. Carroll
Attorney, Agent, or Firm—Walter Becker

[57] ABSTRACT

A hydropneumatic spring element, especially for use in connection with land vehicles such as armored vehicles, especially with a track laying mechanism, in which the wheel force is conveyed to a hydraulic liquid column through the intervention of a wheel rocker and a crank drive and a hydraulic piston, and is supported by a resilient gas volume. All hydropneumatic structural elements of the spring elements are surrounded by a common cooling jacket and are in this way liquid cooled. The cooling fluid flows in the following sequence by the cushioning valve carrier, the hydraulic work cylinder, and the hydraulic storage container.

6 Claims, 2 Drawing Figures

HYDROPNEUMATIC SPRING ELEMENT

The present invention relates to a hydropneumatic spring element, especially for use in heavy land vehicles such as armored cars, especially with track-laying mechanism, in which the wheel force is through the intervention of a wheel rocker, a crank drive and a hydraulic piston conveyed to a hydraulic liquid column and in this way is supported by a resilient gas volume.

Usually hydropneumatic spring elements in addition to comprising the resilient element (a gas volume) also includes the cushioning devices which means the damping valves which throttle the flow of liquid in the spring-in and spring-out stroke direction. The damping work or damping power brought about by the throttling action will be found again in the hydraulic fluid of the spring element in the form of heat, and it is necessary to withdraw this heat and to convey it to the surroundings. The heat withdrawal possibility must assure that the temperature-sensitive structural elements of the hydropneumatic spring (for instance the rubber bags of the hydraulic storage means containing the resilient gas volume, and the sealing sleeves of the hydraulic piston) are not endangered by too high temperatures. Heretofore the heat withdrawal was effected from the surface of the spring elements directly or after heat conduction through metallic contacts to the vehicle super-structure, to which the spring element is connected, to the air surrounding the vehicle. Such an arrangement has the drawback that the quantity of heat withdrawn per time unit, and thus the realizable damping values are relatively limited. In particular, with heavy vehicles, this air cooling is not sufficient in order to realize the relatively high damping which is desired by the oscillation behavior of the vehicle.

It is, therefore, an object of the present invention so to improve the heat withdrawal from the hydropneumatic spring elements that the relatively large quantities of heat which are generated in connection with the damping settings desired from the vehicle can be withdrawn from the spring element without the temperature limits being exceeded by the temperature-sensitive structural elements of the hydropneumatic spring elements. The cooling of the spring elements must be so effected that the heat withdrawal is possibly concentrated to the generating areas of the heat in the sequence of the strength of the individual heat forces.

These and other objects and advantages of the invention will appear more clearly from the following specification in connection with the accompanying drawings, in which.

Figure 1:
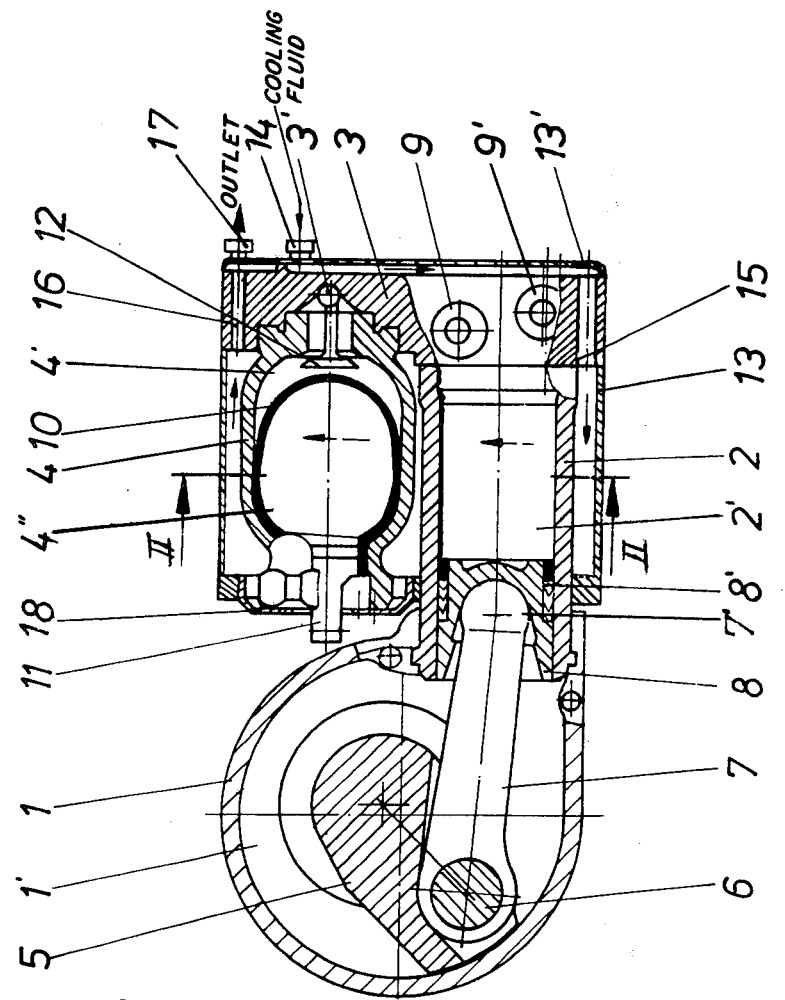
FIG. 1 represents an overall view partly in section of the hydropneumatic spring element according to the invention.
Figure 2:
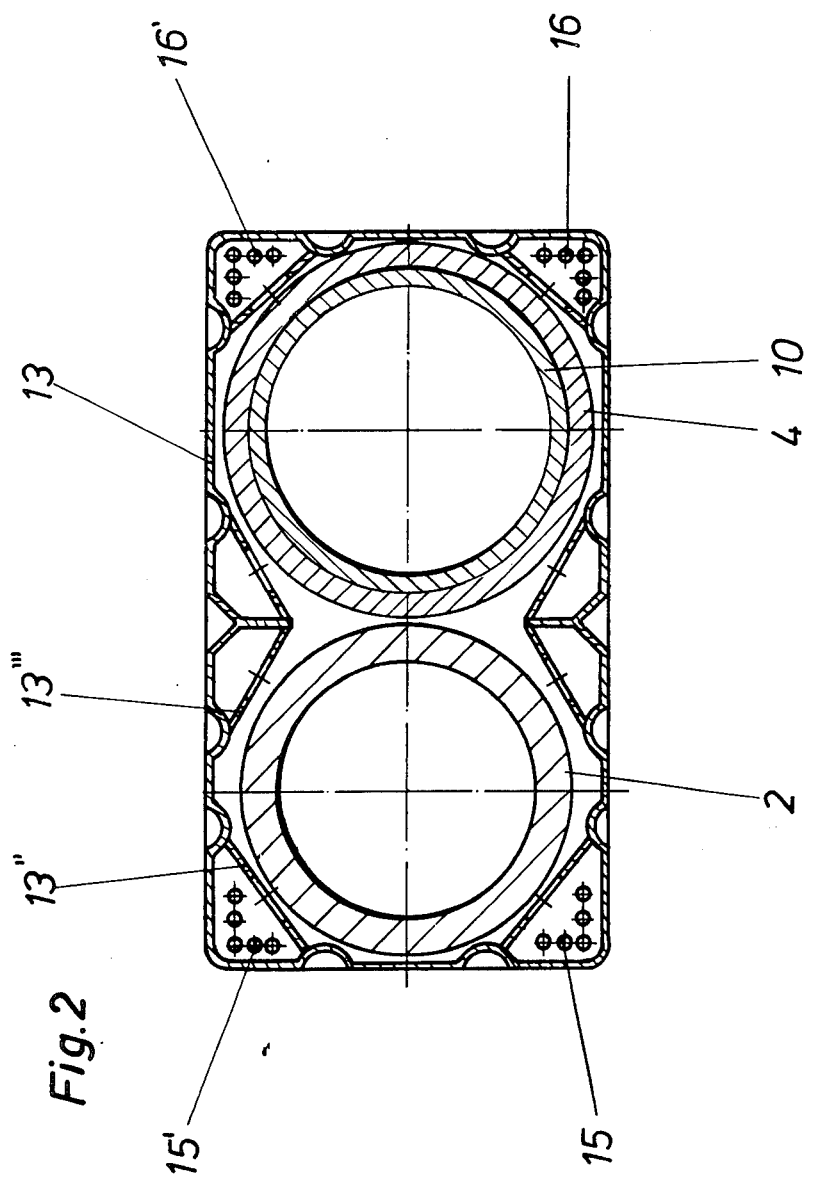
FIG. 2 is a cross section taken along the line II—II of FIG. 1, but on a larger scale than that of FIG. 1.

The hydropneumatic spring element according to the present invention is characterized primarily in that all hydropneumatic structural elements of the spring element are surrounded by a common cooling mantle and are liquid cooled in this way, the cooling fluid current being effected in the following sequence: damping valve carrier, hydraulic working cylinder, and a hydraulic storage means. The quantity of heat which corresponds to the damping work is, as it is well known, generated by turbulence of the high hydraulic fluid velocities generated in the damping valve and thus in the vicinity of the damping valves. It is for this reason that the carrier structural element of the damping valves, according to the invention, contains the entering and thus coldest cooling fluid. In order to seal the hydraulic piston in the working cylinder of the spring element against the high hydraulic fluid pressures, the hydraulic piston is equipped with sealing sleeves which in view of the relatively high unavoidable friction likewise represent a source of heat which, however, in normal circumstances furnishes considerably less heat than the intentional damping by the damping valves. Therefore, this structural element, according to the invention receives the cooling liquid in the second place. In the last place, the cooling fluid flows around the hydraulic storage means in which on an average through its working stroke only a slight quantity of heat will be generated by means of its working strokes because the hydraulic storage means contains only slightly frictional or throttling elements, and the gas — starting from the condition for the mean starting point of the oscillating movements — is compressed and thereby becomes warmer and also expands and thereby becomes colder.

According to a further development of the invention, the damping valve carrier is in a manner known per se designed as a relatively voluminous steel element in the form of a so-called traverse which interconnects hydraulic storage means and the working cylinder, and in which the damping valves are mounted. The voluminous steel element serves as intermediate heat storage means. In this connection, it is particularly favorable to arrange in the traverse the damping valve or valves closer to the working cylinder and farther away from the hydraulic storage means. While in conformity with the above, the heat is generated by the damping in the vicinity of the damping valves, it will be appreciated that the thus heated-up hydraulic liquid will — however reduced in temperature due to the liquid cooling — nevertheless at an over temperature, especially with large spring deviations, pass into the hydraulic storage means or working cylinder. Inasmuch as the storage bag is more sensitive toward increased temperatures than is the case with the sleeve sealing of the hydraulic piston, the cooled stroke of the hydraulic liquid is from the damping valve or valves on in the traverse extended in favor of the more sensitive part in conformity with the above suggestion.

The advantage of the hydropneumatic spring element according to the invention is seen in the better heat transfer numbers and thus in the considerably more intensive heat withdrawal with liquid cooling over air cooling. In addition thereto, by means of the selected withdrawal of the cooling fluid, a maximum of protection in conformity with the different temperature sensitivity of the respective more sensitive elements of the hydropneumatic spring element is taken care of. While according to the German Offenlegungsschrift No. 22,22,587, a cooled hydraulic storage means has become known, it will be appreciated that in a hydropneumatic spring element, the main heat sources are located not in the storage means but on the above mentioned different places. In addition thereto, the guiding of the cooling liquid in the said German Offenlegungsschrift is unfavorable inasmuch as between the cooling liquid inlet and outlet there is provided a short cut flow so that the cooling of the storage vessel is affected.

Referring now to the drawings in detail, showing an embodiment of a hydropneumatic spring element according to the invention, the hydropneumatic spring element comprises a crank housing 1 with its air chamber 1' having connected thereto the working cylinder 2. The working cylinder 2 is closed by a traverse means, girder or crossover bar 3 the other end of which has the hydraulic storage means 4 connected thereto. In the crank housing 1 there is rotatably journalled a rocker 5 which outside the crank housing carries a wheel rocker with a wheel mounted thereon, said last mentioned wheel not being shown. A connecting rod 7 is movably connected to the rocker 5 through the the advance of a crank pin 6. The connecting rod 7 has its other end 7' by means of a ball head connection connected to the piston 8 with sealing sleeves 8'. The traverse contains the passage or conduit 3' which is shown only in part, for the connection between the hydraulic liquid chambers 2' of the working cylinder 2 and 4' of the hydraulic storage means 4 in which the damping valves 9,9' for the spring-in and spring-out direction are located. The hydraulic storage means comprises a rubber bag or container 10 which separates the gas chamber 4" from the hydraulic liquid chamber 4', the gas filling connection 11, and the storage inlet valve 12. Traverse 3, working cylinder 2, and hydraulic storage means 4 are together surrounded by a cooling mantle 13, 13'. The cooling liquid path leads from the inlet connection 11 in conformity with the illustrated arrows first along the traverse 3, traverses the latter in its bores 15, 15', continues around the working cylinder 2 and hydraulic storage means, traverses again traverse 3 in its bores 16, 16', and finally passes to the outlet connection 17.

The cooling mantle 13 is supplemented by inserts 13" and 13''' which keep the path of the cooling substances narrow in order to force high velocities for the cooling liquid and to make sure that high heat transver numbers will be realized. At the same time, these inserts aid in the reinforcement of the cooling mantle 13 against the cooling fluid pressure and by the bores for instance in the reinforcements 13" serve for guiding the cooling liquid which comes from the bores 15, 15' in the traverse 3 toward the working cylinder 2 in order hereto realize an intensive cooling. The cooling mantle 13, 13' is closed by a cover 18 which is connected to the steel housing of the hydraulic storage means 4 for instance by non-illustrated screws. The damping valves 9, 9' are arranged in the traverse 3 as close to the working cylinder 2 as possible and thus are located as far as possible away from the hydraulic storage means 4 and its rubber bag 10.

It is, of course, to be understood that the present invention is, by no means, limited to the specific showing in the drawings, but also comprises any modifications within the scope of the appended claims.

What we claim is:

1. A hydropneumatic spring element, especially for use in connection with land vehicles, especially vehicles of the track laying type, which includes in combination: a crank case, cylinder-piston means connected to said crank case, girder means with first and second portions, hydraulic fluid storage means having an interior, said girder means having the first portion connecting one end of said cylinder-piston means and having said hydraulic fluid storage means connected to the second portion of said girder means, damping valve means supported by said girder means adjacent said cylinder-piston means including a cylinder with an interior and a piston, first conduit means adapted to be connected to a source of cooling fluid and leading to the interior of the cylinder of said cylinder-piston means and to the interior of said fluid storage means, rocker means rotatably journalled in said crank case for connection with a wheel rocker outside said crank case, a connecting rod with a crank pin at one end thereof pivotally connected to said rocker means, said connecting rod having another end portion pivotally connected to the piston of said cylinder piston means, a container made of elastomeric material arranged within said fluid storage means and provided with inlet valve means for connection with a source of gaseous medium and for conveying the gaseous medium into said container, a cooling jacket surrounding said girder means and said cylinder-piston means and said fluid storage means, and having an outlet and including second conduit means having an inlet connectable to a source of cooling liquid and communicating with the interior of said cooling jacket for conveying cooling liquid along the outer walls initially along said girder means and thereafter along said cylinder piston means and along said fluid storage means through said outlet.

2. A spring element in combination according to claim 1, in which said girder means forms a relatively voluminous steel member and interconnects said fluid storage means and said cylinder-piston means, said damping valve means being mounted on said girder means.

3. A spring element in combination according to claim 1, in which said damping valve means are located closer to said cylinder-piston means than to said fluid storage means.

4. A spring element in combination according to claim 1, in which said girder means is provided with bores communicating with the interior of said cooling jacket and forming therewith a cooling circuit.

5. A spring element in combination according to claim 1, in which said cooling jacket includes reinforcements forming restricted cooling passages while directing cooling fluid directly toward said cylinder-piston means.

6. A spring element in combination according to claim 1, which includes cover means connected to said fluid storage means and closing off said cooling jacket.

* * * * *